United States Patent
Cottaar (10) Patent No.: US 6,356,020 B1
(45) Date of Patent: Mar. 12, 2002

(54) ELECTRIC LAMP WITH OPTICAL INTERFERENCE COATING

(75) Inventor: Eduardus J. E. Cottaar, Heerlen (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/338,053

(22) Filed: Jun. 22, 1999

(30) Foreign Application Priority Data

Jul. 6, 1998 (EP) .............................. 98202270

(51) Int. Cl.[7] .......................... H01J 17/16; H01J 61/35
(52) U.S. Cl. ...................... 313/635; 313/112; 313/580; 359/588
(58) Field of Search ................. 313/635, 580, 313/112, 113, 578; 359/586, 588, 589

(56) References Cited

U.S. PATENT DOCUMENTS

| | | | |
|---|---|---|---|
| 4,663,557 A | * 5/1987 | Martin, Jr. et al. | 313/112 |
| 5,113,109 A | * 5/1992 | Kawakatsu et al. | 313/112 |
| 5,138,219 A | 8/1992 | Krisl et al. | 313/112 |
| 5,513,039 A | * 4/1996 | Lu et al. | 359/584 |
| 5,680,001 A | * 10/1997 | Mulder et al. | 313/110 |
| 5,760,853 A | * 6/1998 | Yamashita | 349/30 |

FOREIGN PATENT DOCUMENTS

| | | |
|---|---|---|
| EP | 404459 A2 | * 12/1990 |
| JP | 03135502 A | * 6/1991 |
| JP | 07153435 A | * 6/1995 |
| JP | 07220692 A | * 8/1995 |
| JP | 08005833 A | * 1/1996 |
| JP | 08077980 A | * 3/1996 |
| JP | 08315784 A | * 11/1996 |

* cited by examiner

Primary Examiner—Nimeshkumar D. Patel
Assistant Examiner—Kevin Quarterman
(74) Attorney, Agent, or Firm—Dicran Halajian (57) ABSTRACT

The electric lamp comprises a lamp vessel (1) which is transparent to visible light, and which lamp vessel accommodates a light source. The lamp vessel (1) is covered with an optical interference film (5; 5') which includes layers of alternately a first layer (51, 53) of silica and a second layer (52) of a material having a relatively high refractive index. According to a first aspect of the invention, one of the second layers (52) includes an odd number of sub-layers (52a, 52b, 52c) of alternately a first sub-layer (52a, 52c) of the material with a relatively high refractive index and a second sub-layer (52b) of a further material with a further relatively high refractive index. Preferably, the material of the second sub-layer (52b) is $Ta_2O_5$. According to a second aspect of the invention, one of the second layers (52) includes an odd number of sub-layers (52a, 52b, 52c) of alternately a first sub-layer (52a, 52c) of the material with the relatively high refractive index and a second sub-layer (52b) of silica with an optical layer thickness smaller than 20 nm. Preferably, the physical layer thickness $d_{ph}$ of the second sub-layer (52b) is less than 25 nm. Preferably, each high-refractive index layer (52) includes three sub-layers (52a, 52b, 52c). The electric lamp according to the invention exhibits reduced diffuse scattering.

9 Claims, 5 Drawing Sheets

ELECTRIC LAMP WITH OPTICAL INTERFERENCE COATING

BACKGROUND OF THE INVENTION

The invention relates to an electric lamp comprising a light-transmitting lamp vessel which accommodates a light source, at least a part of the lamp vessel being provided with an interference film, the interference film including layers of alternately a first layer which is made predominantly of silicon oxide and a second layer which is made of a material having a refractive index which is high as compared to a refractive index of silicon oxide which is 1.45.

An electric lamp of this type is known from U.S. Pat. No. 5,138,219. In the known discharge lamp, the layers having a high refractive index are made of tantalum oxide. These layers may alternatively consist of niobium oxide or titanium oxide. The layers may also be composed of a combination of two layers, for example $TiO_2.ZrO_2$, $TiO_2.HfO_2$, $TiO_2.Nb_2O_5$, $TiO_2.Ta_2O_5$ or $Ta_2O_5.2TiO_2$.

It is a drawback of lamps having an interference film on the lamp vessel that the film is exposed to substantially varying temperatures (above 500° C.). As a result, diffuse scattering of the interference film during the service life of the electric lamp increases. Diffuse scattering leads to an unclear transparent lamp. Diffuse scattering additionally causes the direction in which (for example infrared) radiation is reflected by the interference film to be changed relative to the desired direction, thus causing the efficacy of the lamp to be reduced.

SUMMARY OF THE INVENTION

It is an object of the invention to provide an electric lamp, in which diffuse scattering of the interference film is reduced.

In accordance with a first aspect of the invention, one of the second layers comprises an odd number of sub-layers of alternately a first sub-layer of the material with the high refractive index (over 1.45) and a second sub-layer of a further material with a high refractive index (over 1.45).

During the service life of the electric lamp, the lamp vessel of which is provided with an optical interference film, crystallization occurs of, in particular, the (high-refraction) material of the second layer of the interference film. In addition, as a result of temperature changes, the crystallization state of the material of the second layer may change. Crystallization is regarded as one of the causes of diffuse scattering occurring during the service life of a lamp provided with a lamp vessel covered with an interference film. It has been found that the crystals can grow bigger as the thickness of the layer of the high-refraction material is larger. The effect on diffuse scattering increases as the crystals become bigger. If, in accordance with a first aspect of the invention, the (relatively thick) second layers of the high-refraction material in the interference film are built up of a stack of an odd number of sub-layers, whereby between two first sub-layers of the material with the high refractive index a second sub-layer of a further material with a further high refractive index is sandwiched, the possibilities of crystal growth in the second layer are effectively reduced by 50%. By virtue of the measure in accordance with the invention, crystals developing in the odd sub-layers can only grow within said sub-layer and will consequently remain relatively small, so that the effect of such crystals on diffuse scattering is reduced. By sandwiching a (second) sub-layer of the further material with the further high refractive index between two (first) sub-layers of the material with the high refractive index, the relatively thick layer of the material with the high refractive index is interrupted as it were, which has a favorable effect on the reduction of undesirable diffuse scattering.

Preferably, the further material of the second sub-layer is selected from the group formed by tantalum oxide, zirconium oxide, hafnium oxide and combinations of these materials. Particularly the high-refraction optical material tantalum oxide exhibits favorable properties at higher temperatures. It is further desirable that the refractive index of the further material forming the second sub-layer should correspond at least substantially to the refractive index of the material of the first sub-layer. If so, the spectrum of the interference film in accordance with the invention hardly differs from that of the known interference film. A suitable choice of the material of the second sub-layer (for example a combination of two high-refraction materials) enables the refractive indices of the materials of the first and the second sub-layer to be properly matched. Suitable combinations of high-refraction materials are $TiO_2.ZrO_2$, $TiO_2.HfO_2$ and $TiO_2.Nb_2O_5$. A further suitable combination of high-refraction materials is $TiO_2.Nb_2O_5$. In a very favorable, alternative embodiment of the electric lamp in accordance with a first aspect of the invention, the further material of the second sub-layer includes a combination of titanium oxide and tantalum oxide. Such a combination of materials (for example $TiO_2.Ta_2O_5$ or $Ta_2O_5.2TiO_2$) unites the favorable property that the refractive index of titanium oxide is relatively high relative to that of silicon oxide with the favorable behavior of tantalum oxide at relatively high temperatures.

Preferably, the stack of an odd number of alternately a first and a second sub-layer comprises three sub-layers, namely two (first) sub-layers of the high-refraction material between which a (second) sub-layer of the further material with the further high refractive index is sandwiched.

In accordance with a second aspect of the invention, one of the second layers comprises an odd number of sub-layers of alternately a first sub-layer of the material with the high refractive index and a second sub-layer of silicon oxide, the optical layer thickness $d_{op}$ of the second sub-layer lying in the range $1 \leq d_{op} \leq 20$ nm.

By incorporating such a second sub-layer of silicon oxide having a relatively low refractive index, the optical layer thickness of which is chosen so that these second sub-layers contribute little, or not at all, to the optical effect of the interference film, the possibilities of crystal growth in the second (high-refraction) layer are effectively reduced by 50%. By virtue of the measure in accordance with the invention, crystals which develop in the odd sub-layers can grow only within said sub-layer and, as a result, will remain relatively small, so that the effect of such crystals on diffuse scattering is reduced. By sandwiching a (second) sub-layer of silicon oxide between two (first) sub-layers of the material with the high refractive index, the relatively thick layer of the material with the high refractive index is interrupted as it were, which has a favorable effect on the reduction of undesirable diffuse scattering.

An expression which in connection with the term optical layer thickness is known to those skilled in the art is QWOT (="Quarter Wave Optical Thickness"), which is defined as the wavelength at which the optical thickness of a layer is equal to a quarter (0.25) of the design wavelength of the stack of the interference film, that is:

$$QWOT = 4nd_{ph} \cos \alpha$$

where $n \times d_{ph}$ is the product of the (complex) refractive index n and the physical layer thickness $d_{ph}$, and $\alpha$ is the angle at which the light is incident on the interference film (if light is incident transversely to the stack of layers, then α=0°). As a result of the relative simplicity of stacks of such so-called "quarter-wave" optical layer thicknesses, designs of interference films are often referred to in terms of fractions of "quarter-waves" at a reference wavelength.

Preferably, the optical layer thickness of the second sub-layer is smaller than or equal to 10 nm ($d_{op} \leq 10$ nm). Such relatively thin sub-layers with such a small optical layer thickness practically have no effect on the spectral characteristic of the interference film. An existing design of an interference film does not have to be adapted if the optical layer thickness of the second sub-layer is smaller than or equal to 5 mn ($d_{op} < 5$ nm).

Preferably, the stack of an odd number of alternately a first and a second sub-layer comprises three sub-layers, that is two (first) sub-layers of the high- refraction material between which a relatively thin (second) sub-layer of silicon oxide with a relatively low refractive index is sandwiched.

It has been found that the interference film of the electric lamp in accordance with the invention keeps its initial properties to a large extent during the service life of the lamp.

In a favorable embodiment of the electric lamp in accordance with the invention, the physical layer thickness $d_{ph}$ of the second sub-layer lies in the range $1 \leq d_{ph} \leq 25$ nm. If the thickness of the second sub-layer exceeds 25 nm, then there is a substantial influence on the optical properties of the interference film, so that undesirable side-effects on the transmission or reflection properties of the interference film occur. A lower limit of 1 nm is desirable to ensure that at least one or a few monolayers of the second sub-layer are situated between the first sub-layers.

Preferably, the physical layer thickness $d_{ph}$ of the second sub-layer lies in the range $2 < d_{ph} < 12$ nm. The effect of such layer thicknesses on the spectral characteristic of the interference film is small. Physical layer thicknesses of the second sub-layer below or equal to 5 nm ($d_{ph} < 5$ nm) are particularly favorable.

Preferably, the material of the first sub-layer comprises predominantly niobium oxide or titanium oxide. Of the high-refraction niobium oxide ($Nb_2O_5$) various crystal forms are known: while in the course of a sputtering process an amorphous material is deposited, this material exhibits, at approximately 300° C., a transition to a so-called T-structure with a substantially hexagonal cation lattice. At approximately 500° C., a transition to a so-called TT-structure takes place. At approximately 700° C., a slow transition to a so-called H-structure, which causes diffuse scattering, occurs. Of the high-refraction titanium oxide ($TiO_2$) two crystal forms are known (anatase and rutile) which blend with each other at approximately 600° C. Particularly the high-temperature rutile form causes diffuse scattering. If said high-refraction materials ($Nb_2O_b$ and $TiO_2$) are incorporated in an interference film on a lamp vessel of an electric lamp, which lamp vessel during the service life of the lamp is subject to (frequent) temperature changes between room temperature and temperatures above 500° C. (temperatures as high as 900° C. are no exception), these materials are known to cause diffuse scattering of the interference film, thereby adversely affecting the action of the interference film. Particularly for materials of the second layer, such as niobium oxide or titanium oxide, the measure in accordance with the invention can be advantageously used.

The light source of the lamp may be an incandescent body, for example in a halogen-containing gas, but it may alternatively be an electrode pair in an ionizable gas, for example an inert gas with metal halides, if necessary with, for example, mercury as the buffer gas. The light source may be surrounded by an innermost gastight envelope. It is alternatively possible that an outermost envelope surrounds the lamp vessel.

The interference film may transmit visible light and reflect IR (=infrared) light. In this case, the layers of the film are relatively thick, the optical layer thickness being a quarter of a wavelength in the IR-region of the spectrum. It is alternatively possible for the film to reflect UV (=ultraviolet) light and transmit visible light, or conversely. The filter may also be a so-called "bandpass" filter, which transmits a part of the visible radiation and reflects other parts of the spectrum. In the case of an IR-reflecting filter having relatively thick layers, and also if a relatively large number of layers are stacked and the interference film has a relatively large thickness of, for example, 3.5 to 4 μm, the interference film in accordance with the measure of the invention was found to retain its favorable properties.

The interference film may be provided in a customary manner, for example by vapor deposition (PVD: physical vapor deposition) or by (DC) (reactive) sputtering or by means of a dip-coating process or LP-CVD (Low Pressure Chemical Vapor Deposition), or PE-CVD (Plasma Enhanced CVD).

These and other aspects of the invention will be apparent from and elucidated with reference to the embodiments described hereinafter.

BRIEF DESCRIPTION OF THE DRAWINGS

The Figures are purely schematic and not drawn to scale. Particularly for clarity, some dimensions are exaggerated strongly. In the Figures, like reference numerals refer to like parts whenever possible.

DETAILED DESCRIPTION OF THE PREFERRED EMBODIMENTS

Figure 1:
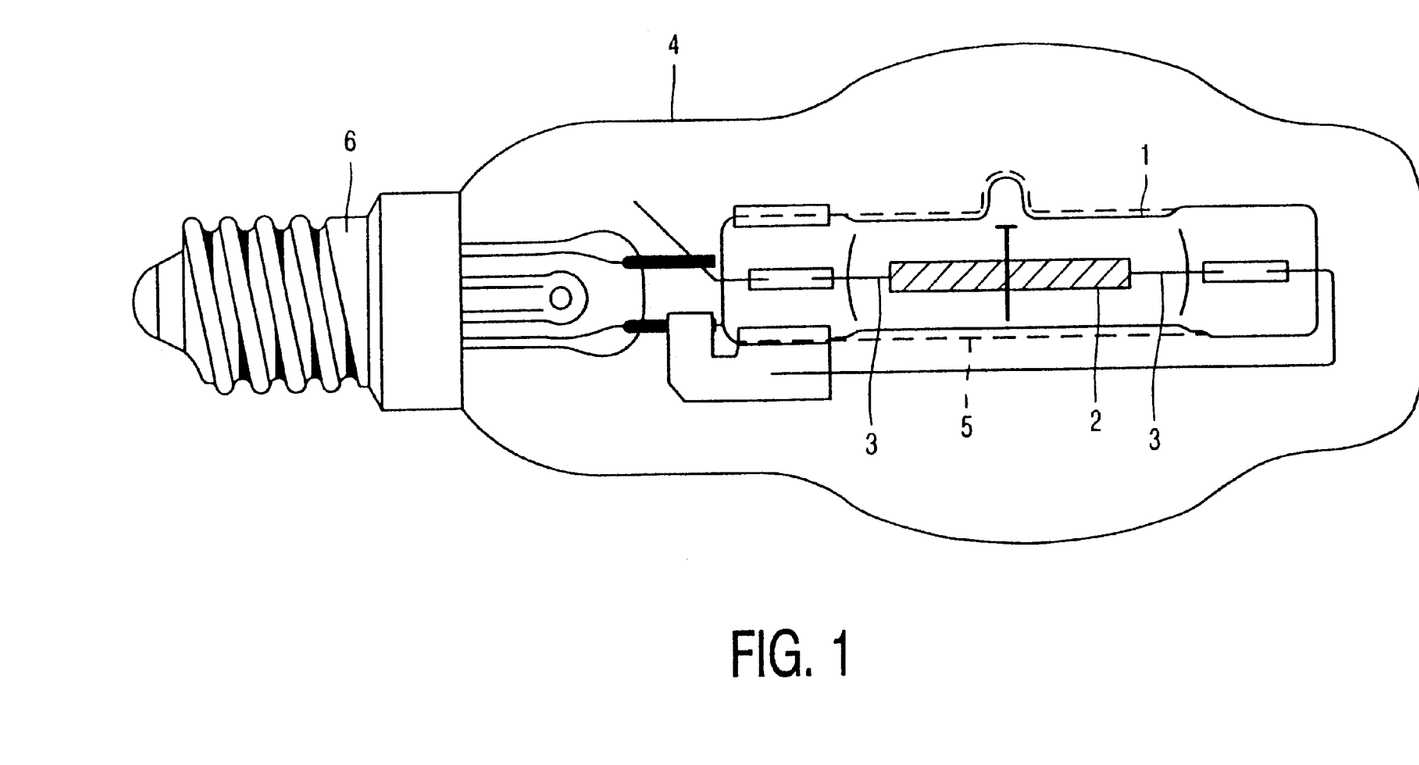
FIG. 1 is a side view of an electric incandescent lamp.

In FIG. 1, the electric lamp has a quartz glass lamp vessel 1 in which an incandescent body is arranged as the light source 2. Current conductors 3 are connected thereto and issue from the lamp vessel 1 to the exterior. The lamp vessel 1 is filled with a gas comprising halogen, for example hydrogen bromide. At least a portion of the lamp vessel 1 is coated with an interference film 5 which comprises layers (see FIG. 2A) of alternately a first layer 51 of predominantly silicon oxide (refractive index, on average, approximately 1.45) and a second layer 52 of a material having a relatively high refractive index, in this example niobium oxide (refractive index, on average, approximately 2.35). In this example, the interference film 5 further comprises a silicon oxide-containing adhesive layer 53, by means of which the adhesion of the interference film 5 to the substrate (=the above-mentioned part of the lamp vessel 1) is enhanced. The interference film transmits visible radiation and reflects infrared radiation.

The lamp vessel 1 is mounted in an outer envelope 4 which supports a lamp cap 6 to which the current conductors 3 are electrically connected. The lamp shown is a 60 W mains voltage lamp with a rated life of at least substantially 2000 hours.

Figure 2A:
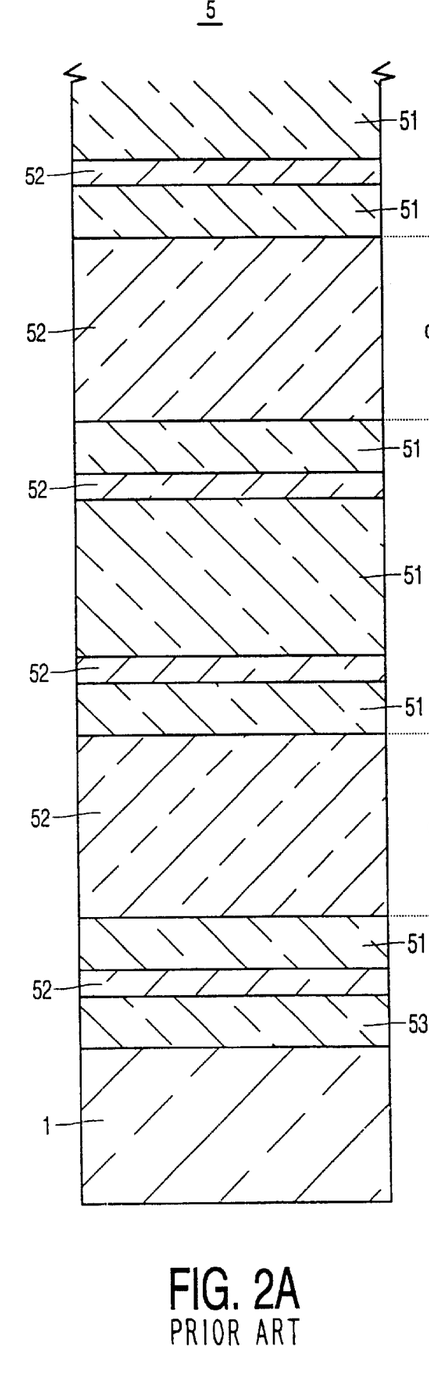
FIG. 2A shows a detail of the interference film in accordance with the known embodiment.

FIG. 2A schematically shows a detail of the structure of an interference film 5, shown in FIG. 1, in accordance with the known embodiment (for an enumeration of the layer thicknesses reference is made to columns 2 and 3 in Table I).

Figure 2B:
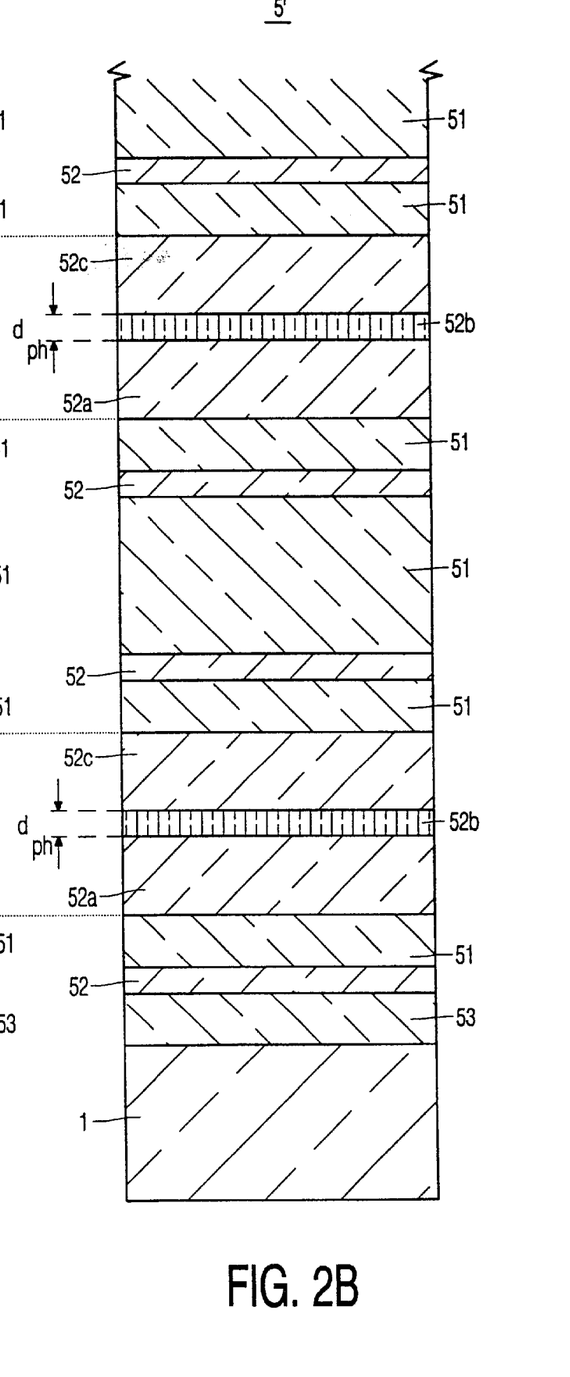
FIG. 2B shows a detail of an interference film in accordance with the invention.

FIG. 2B schematically shows a detail of the structure of an interference film 5' in accordance with a first aspect of the invention, relatively thick niobium oxide layers being divided into three sub-layers of alternately a first sub-layer 52a of niobium oxide, a second sub-layer 52b of tantalum oxide (refractive index, on average, approximately 2.15) and a third sub-layer 52c of niobium oxide (for an enumeration of the respective layer thicknesses reference is made to columns 4, 5 and 6 in Table I). In this example, the (physical) layer thicknesses of the first and the third sub-layer 52a, 52c are chosen so as to be equal to each other and each amount to less than 50% of the original layer thickness. The physical layer thickness of the second sub-layer 52b is indicated by $d_{ph}$ and is preferably equal to or smaller than 5 nm ($d_{op} = n \times d_{ph}$).

FIG. 2B also schematically shows a detail of the structure of an interference film 5' in accordance with a second aspect of the invention, relatively thick niobium oxide layers being divided into three sub-layers of alternately a first sub-layer 52a of niobium oxide, a second sub-layer 52b of silicon (average refractive index approximately 1.45) and a third sub-layer 52c of niobium oxide (for an enumeration of the respective layer thicknesses reference is made to columns 7 and 8 in Table I). In this example, the (physical) layer thicknesses of the first and the third sub-layer 52a, 52c are chosen to be equal to each other and each amount to less than 50% of the original layer thickness. The physical layer thickness of the second sub-layer 52b is indicated by $d_{ph}$ and is preferably equal to or smaller than 5 nm ($d_{op} = n \times d_{ph}$).

The relevant part of the lamp vessel 1 is coated with the interference film 5' in accordance with the invention by means of reactive sputtering. In the case of reactive sputtering, the layers of $SiO_2$ are obtained by sputtering Si in an environment of Ar and $O_2$. Typical conditions are: an Ar-pressure of 400–1400 Pa (3–10 mtorr) and an $O_2$-pressure of 25–50 Pa (0.2–0.4 mtorr). Also the material with the high refractive index is obtained by sputtering the metallic material in an Ar/$O_2$ mixture. Typical conditions are: an Ar-pressure of 400–1400 Pa (3–10 mtorr) and an $O_2$-pressure of 40–140 Pa (0.3–1.0 mtorr). In general, for both materials the Ar pressure is controlled by means of a constant flow, and the oxygen is controlled by means of a specific oxygen sensor. The sputtering process takes place in a temperature range from 20 to 100° C.

The interference film 5' in accordance with the invention remained in tact throughout the rated life of the lamp and retained its initial properties.

TABLE I

Interference films with physical layer thicknesses

| Layer | Known interference film $SiO_2$ (nm) | Known interference film $Nb_2O_5$ (nm) | Interference film in accordance with a first aspect of the invention $SiO_2$ (nm) | Interference film in accordance with a first aspect of the invention $Nb_2O_5$ (nm) | Interference film in accordance with a first aspect of the invention $Ta_2O_5$ (nm) | Interference film in accordance with a second aspect of the invention $SiO_2$ (nm) | Interference film in accordance with a second aspect of the invention $Nb_2O_5$ (nm) |
|---|---|---|---|---|---|---|---|
| Substrate | | | | | | | |
| 1 | 34.5 | | 34.5 | | | 34.5 | |
| 2 | | 13.9 | | 13.9 | | | 13.9 |
| 3 | 30.6 | | 30.6 | | | 30.6 | |
| 4 | | 120.1 | | 55.1 | 10.0 | 5.0 | 55.1 |
| | | | | 55.1 | | | 55.1 |
| 5 | 30.7 | | 30.7 | | | 30.7 | |
| 6 | | 16.4 | | 16.4 | | | 16.4 |
| 7 | 217.0 | | 217.0 | | | 217.0 | |
| 8 | | 15.7 | | 15.7 | | | 15.7 |
| 9 | 29.3 | | 29.3 | | | 29.3 | |
| 10 | | 114.6 | | 52.6 | 10.0 | 5.0 | 52.6 |
| | | | | 52.6 | | | 52.6 |
| 11 | 28.6 | | 28.6 | | | 28.6 | |
| 12 | | 13.8 | | 13.8 | | | 13.8 |
| 13 | 352.1 | | 352.1 | | | 352.1 | |
| 14 | | 15.3 | | 15.3 | | | 15.3 |
| 15 | 28.5 | | 28.5 | | | 28.5 | |
| 16 | | 122.5 | | 56.0 | 10.0 | 5.0 | 56.0 |
| | | | | 56.0 | | | 56.0 |
| 17 | 27.1 | | 27.1 | | | 27.1 | |
| 18 | | 16.7 | | 16.7 | | | 16.7 |
| 19 | 181.6 | | 181.6 | | | 181.6 | |
| 20 | | 14.6 | | 14.6 | | | 14.6 |
| 21 | 23.2 | | 23.2 | | | 23.2 | |
| 22 | | 111.0 | | 51.0 | 10.0 | 5.0 | 51.0 |
| | | | | 51.0 | | | 51.0 |
| 23 | 26.4 | | 26.4 | | | 26.4 | |
| 24 | | 16.3 | | 16.8 | | | 16.8 |
| 25 | 200.6 | | 200.6 | | | 200.6 | |
| 26 | | 16.5 | | 16.5 | | | 16.5 |
| 27 | 25.3 | | 25.3 | | | 25.3 | |
| 28 | | 100.3 | | 45.0 | 10.0 | 5.0 | 45.0 |
| | | | | 45.0 | | | 45.0 |
| 29 | 18.9 | | 18.9 | | | 18.9 | |
| 30 | | 16.8 | | 16.8 | | | 16.8 |
| 31 | 193.7 | | 193.7 | | | 193.7 | |
| 32 | | 19.8 | | 19.8 | | | 19.8 |
| 33 | 25.3 | | 25.3 | | | 25.3 | |
| 34 | | 87.3 | | 39.0 | 10.0 | 5.0 | 39.0 |
| | | | | 39.0 | | | 39.0 |
| 35 | 10.5 | | 10.5 | | | 10.5 | |
| 36 | | 24.4 | | 24.4 | | | 24.4 |
| 37 | 174.0 | | 174.0 | | | 174.0 | |
| 38 | | 99.5 | | 45.0 | 10.0 | 5.0 | 45.0 |
| | | | | 45.0 | | | 45.0 |
| 39 | 164.9 | | 164.9 | | | 164.9 | |
| 40 | | 94.6 | | 45.0 | 10.0 | 5.0 | 45.0 |
| | | | | 45.0 | | | 45.0 |
| 41 | 156.9 | | 156.9 | | | 156.9 | |
| 42 | | 92.4 | | 45.0 | 10.0 | 5.0 | 45.0 |
| | | | | 45.0 | | | 45.0 |
| 43 | 160.9 | | 160.9 | | | 160.9 | |
| 44 | | 96.4 | | 45.0 | 10.0 | 5.0 | 45.0 |
| | | | | 45.0 | | | 45.0 |
| 45 | 162.2 | | 162.2 | | | 162.2 | |
| | | | | 45.0 | | | 45.0 |

TABLE I-continued

Interference films with physical layer thicknesses

|  | Known interference film | | Interference film in accordance with a first aspect of the invention | | | Interference film in accordance with a second aspect of the invention | |
| --- | --- | --- | --- | --- | --- | --- | --- |
| Layer | SiO$_2$ (nm) | Nb$_2$O$_5$ (nm) | SiO$_2$ (nm) | Nb$_2$O$_5$ (nm) | Ta$_2$O$_5$ (nm) | SiO$_2$ (nm) | Nb$_2$O$_5$ (nm) |
| 46 |  | 95.0 |  | 45.0 | 10.0 | 5.0 | 45.0 |
| 47 | 80.4 |  | 80.4 |  |  | 80.4 |  |
| Air |  |  |  |  |  |  |  |

Figure 3:
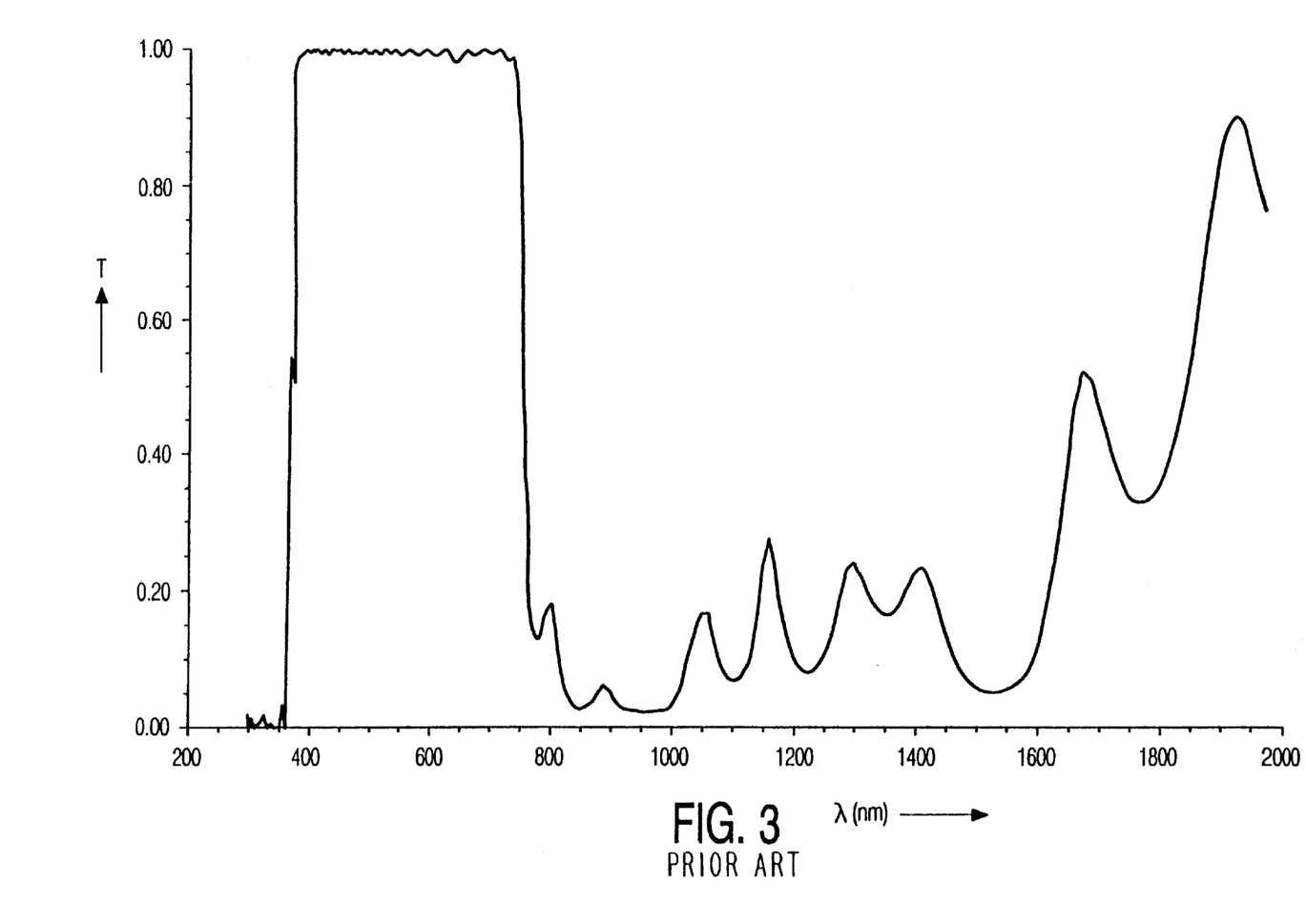
FIG. 3 shows the known transmission spectrum of an infrared reflecting interference film.

FIG. 3 shows the transmission spectrum as a function of the wavelength λ (in nm) of an infrared reflecting interference film 5, which is known per se, and which is built up of 47 alternate layers of SiO$_2$ and Nb$_2$O$_5$ on a glass substrate (see columns 2 and 3 in Table I). In general, the transmission of the known interference film is higher than at least 90% in the visible wavelength range from 400 to 770 nm, and said interference film exhibits, in the wavelength range from 800 to 1900 nm, a broad reflection band with an average reflection which is at least higher than 70%. In this example, the known interference film is composed of three so-called multiperiod stacks, which are known per se, and which spectrally border on each other. In general, the interference film is the result of known computer optimizations of a design for an infrared reflecting optical interference film.

The interference film 5 shown in FIG. 3 comprises a computer optimization of a design for an infrared reflecting interference film including three successive stacks of alternating high-refraction and low-refraction layers, which layers are referenced, respectively, H and L. A first stack has a design wavelength of 1700 nm (the design wavelength is the wavelength which corresponds to the center of the reflection band), so that the optical layer thickness for the material having a high refractive index and the material having a low refractive index is equal to 425 nm. A second stack has a design wavelength of 1300 nm with a corresponding optical layer thickness of 333 nm for the material having a high refractive index and the material having a low refractive index. The first and the second stack each comprise seven layers of alternately high-refraction and low-refraction material of the type:

$$a_1 \times Lb_1 \times Ha_2 \times Lb_2 \times Ha_2 \times Lb_1 \times Ha_1 \times L),$$

which is known per se, and wherein the coefficients $a_1$, $a_2$, $b_1$ and $b_2$ are the result of the computer optimization. A third stack has a design wavelength of 930 nm with an optical layer thickness of the high-refraction and low-refraction material of 233 nm. The third stack comprises three layers of alternately high-refraction and low-refraction material of the type:

$$(L/2HL/2),$$

which is known per se. The infrared reflecting interference film, the physical layer thicknesses of which are shown in columns 2 and 3 of Table I, successively comprises three times the first stack of layers (layers 1–7, layers 7–13, layers 13–19), followed by three times the second stack of layers (layers 19–25, layers 25–31, layers 31–37) and subsequently five times the third stack of layers (layers 37–39, layers 39–41, layers 41–43, layers 43–45, layers 45–47).

Figure 4:
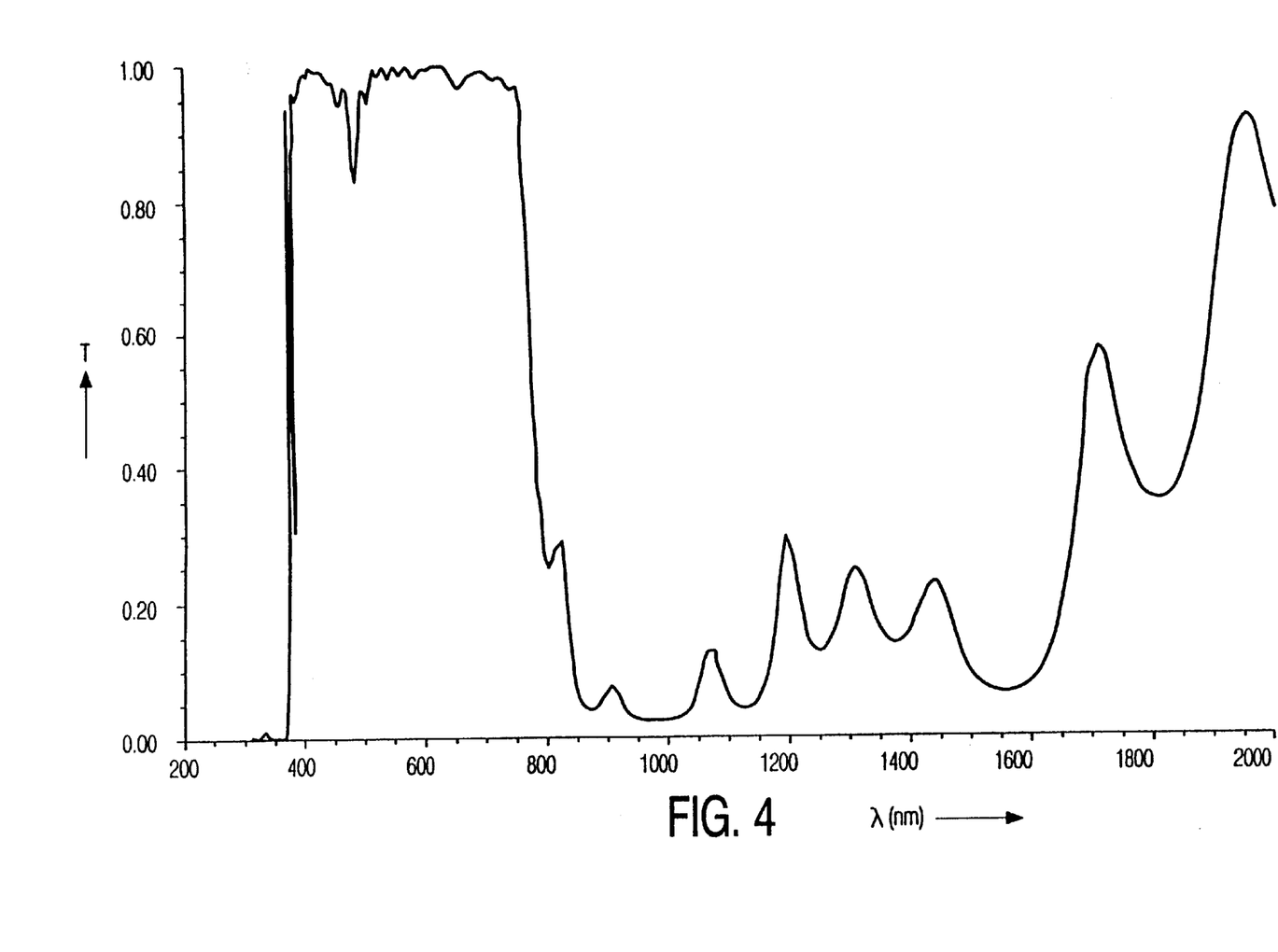
FIG. 4 shows the transmission spectrum of an infrared reflecting interference film in accordance with a first aspect of the invention.

FIG. 4 shows the transmission spectrum as a function of the wavelength λ (in nm) of an infrared reflecting interference film 5' in accordance with a first aspect of the invention, which is built up according to the same principle as the interference film 5 shown in FIG. 3. However, in accordance with the measure of the invention, each of the (eleven) relatively thick Nb$_2$O$_5$ layers 52 (having a layer thickness beyond 50 nm) is divided into three sub-layers 52a, 52b, 52c comprising a first sub-layer 52a and a third sub-layer 52c of Nb$_2$O$_5$, between which a second, relatively thin sub-layer 52b of Ta$_2$O$_5$ is sandwiched (see FIG. 2B). Instead of the known 47-layer infrared reflecting interference film 5, an interference film 5' is obtained which includes 69 layers (see columns 4, 5 and 6 of Table I). The layer thicknesses of the first and the third sub-layers 52a, 52c are less than half the layer thickness of the (original) layer 52 (cf. columns 3 and 5 in Table I). The physical layer thickness $d_{ph}$ of the second sub-layer 52b amounts to 10 nm (see column 6 in Table I). For clarity, in the example of Table I the other layer thicknesses of the layers are kept the same. As a result, the transmission spectrum, as shown in FIG. 4, exhibits a small decline in the visible region near approximately 490 nm. Further computer optimization of the interference film reduces the influence of this decline.

Figure 5:
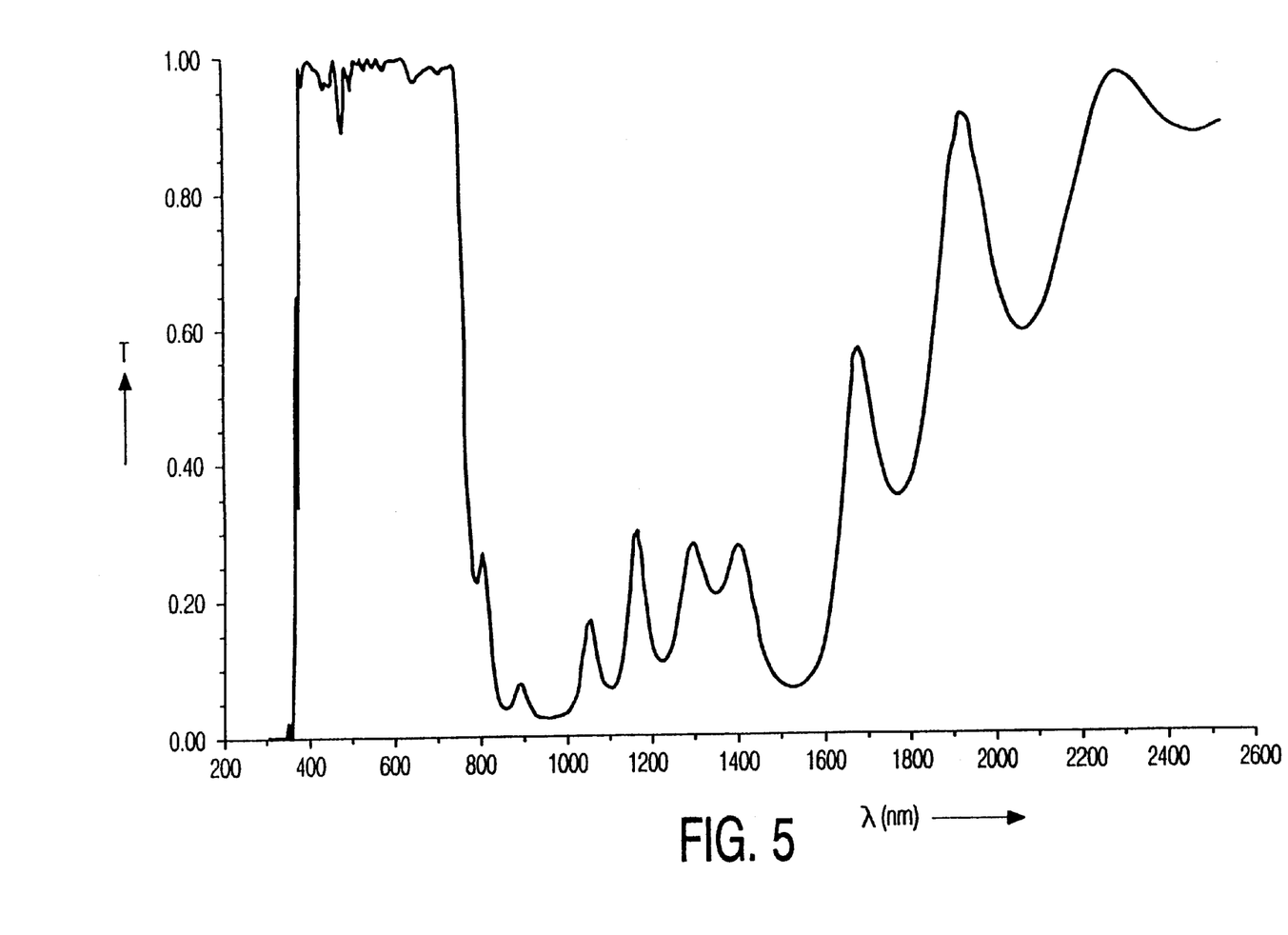
FIG. 5 shows the transmission spectrum of an infrared reflecting interference film in accordance with a second aspect of the invention.

FIG. 5 shows the transmission spectrum as a function of the wavelength λ (in nm) of an infrared reflecting interference film 5' in accordance with a second aspect of the invention, which interference film is built up according to the same principle as the interference film 5 shown in FIG. 3. However, in accordance with the measure of the invention, each of the (eleven) relatively thick Nb$_2$O$_5$ layers 52 (having a layer thickness above 50 nm) is divided into three sub-layers 52a, 52b, 52c comprising a first sub-layer 52a and a third sub-layer 52c of Nb$_2$O$_5$, between which a second, relatively thin sub-layer 52b of SiO$_2$ is sandwiched (see FIG. 2B). Instead of the known 47-layer infrared reflecting interference film 5, an interference film 5' is obtained which comprises 69 layers (see columns 7 and 8 in Table I). The layer thicknesses of the first and the third sub-layer 52a, 52c are less than half the layer thickness of the (original) layer 52 (cf. columns 3 and 8 of Table I). In this example, the physical layer thickness $d_{ph}$ of the second sub-layer 52b is 5 nm (see column 7 in Table I). In the example of Table I, the other layer thicknesses of the layers are kept the same for clarity. As a result, the transmission spectrum, as shown in FIG. 5, exhibits a small decline in the visible range at approximately 490 nm. Further computer optimization of the interference film reduces the influence of this decline. At a physical layer thickness $d_{ph}$ of the second layer 52b of 2 nm, no optical influence of the interposed second sub-layers is noticeable in the spectral characteristic of the interference film.

It will be obvious that within the scope of the invention many variations are possible to those skilled in the art.

The invention is embodied in each novel characteristic and each combination of characteristics.

What is claimed is:

1. An electric lamp comprising a light-transmitting lamp vessel (1) which accommodates a light source (2),
at least a part of the lamp vessel (2) being provided with an interference film (5),
said interference film (5) including layers (51, 52, 53) of alternately a first layer (51, 53) which is made predominantly of silicon oxide and a second layer (52) which is made of a first material having a refractive index over 1.45 wherein
at least one of the second layers (52) comprises an odd number of sub-layers (52a, 52b, 52c) of alternately a first sub-layer (52a, 52c) of the first material and a second sub-layer (52b) of a second material also having a refractive index over 1.45.

2. An electric lamp as claimed in claim 1, wherein the second material is selected from the group formed by tantalum oxide, zirconium oxide, hafnium oxide and combinations of said materials.

3. An electric lamp as claimed in claim 1, wherein the second material includes a combination of titanium oxide and tantalum oxide.

4. An electric lamp as claimed in claim 1, wherein the physical layer thickness $d_{ph}$ of the second sub-layer (52b) lies in the range $1 \leq d_{ph} \leq 25$ nm.

5. An electric lamp as claimed in claim 4, wherein the physical layer thickness $d_{ph}$ of the second sub-layer (52b) lies in the range $2 \leq d_{ph} \leq 12$ nm.

6. An electric lamp as claimed in claim 1, wherein the at least one second layer (52) comprises three sub-layers (52a, 52b, 52c).

7. An electric lamp as claimed in claim 1, wherein the first material consists essentially of niobium oxide or titanium oxide.

8. An electric lamp comprising a light-transmitting lamp vessel (1) which accommodates a light source (2), at least a part of the lamp vessel (2) being provided with an interference film (5), said interference film (5) including layers (51, 52, 53) of alternately a first layer (51, 53) which is made predominantly of silicon oxide and a second layer (52) which is made of first material having a refractive over 1.45 wherein, at least one of the second layers (52) comprises an odd number of sub-layers (52a, 52b, 52c) of alternately a first sub-layer (52a, 52c) of the first material first and a second sub-layer (52b) of silicon oxide, the optical layer thickness $d_{op}$ of the second sub-layer (52b) lying in the range $1 \leq d_{op} \leq 20$ nm.

9. An electric lamp as claimed in claim 8, wherein the optical layer thickness $d_{op}$ of the second sub-layer (52b) is smaller than or equal to 10 nm.

* * * * *